United States Patent
Gorg et al.

(10) Patent No.: US 8,630,232 B2
(45) Date of Patent: Jan. 14, 2014

(54) METHOD FOR MANAGING A MOBILE NETWORK

(75) Inventors: Carmelita Gorg, Bremen (DE); Varaporn Pangboonyanon, Bremen (DE); Frank Pittmann, Berlin (DE); Asanga Udugama, Bremen (DE)

(73) Assignee: Nokia Siemens Networks GmbH & Co. KG, Munich (DE)

(*) Notice: Subject to any disclaimer, the term of this patent is extended or adjusted under 35 U.S.C. 154(b) by 404 days.

(21) Appl. No.: 13/000,497

(22) PCT Filed: Jun. 23, 2008

(86) PCT No.: PCT/EP2008/057952
§ 371 (c)(1),
(2), (4) Date: Dec. 21, 2010

(87) PCT Pub. No.: WO2009/155964
PCT Pub. Date: Dec. 30, 2009

(65) Prior Publication Data
US 2011/0103313 A1    May 5, 2011

(51) Int. Cl.
H04W 4/00    (2009.01)

(52) U.S. Cl.
USPC ......... 370/328; 455/403; 455/422.1; 455/450

(58) Field of Classification Search
USPC .......................... 370/328, 331–334
See application file for complete search history.

(56) References Cited

U.S. PATENT DOCUMENTS

2009/0257401 A1* 10/2009 Hirano et al. ............... 370/331

OTHER PUBLICATIONS

T. Ernst et al., Network Mobility Support Terminology draft-ietf-nemo-terminology-06, NEMO Working Group, Nov. 9, 2006, pp. 1-26.
Chia-Ho Ou et al., An Enhanced Mechanism for Supporting Mobile Networks in Mobile IP, IEEE Semiannual Vehicular Technology Conference Proceedings, Apr. 2003, pp. 2256-2260.
S. Deering et al., Internet Protocol, Version 6 (IPv6) Specification, Network Working Group, RFC 2460, Dec. 1998, pp. 1-39.
V. Devarapalli et al., Network Mobility (NEMO) Basic Support Protocol, Network Working Group, RFC 3963, Jan. 2005, pp. 1-33.
D. Johnson et al., Mobility Support in IPv6, Network Working Group, RFC 3775, Jun. 2004, pp. 1-165.

* cited by examiner

Primary Examiner — Charles C Jiang
(74) Attorney, Agent, or Firm — Squire Sanders (US) LLP (57) ABSTRACT

A method for managing a mobile network having local mobile nodes and a mobile router for routing packets amongst said local mobile nodes and to and from another packet routing network comprises the steps of, in response to a recognized indication condition indicating that a local mobile node left the mobile network, notifying one or more components in the mobile accordingly, and in one or more of the components of the mobile network, adapting one or more settings in accordance with said notification.

15 Claims, 12 Drawing Sheets

| Destination | Source | Network Interface |
|---|---|---|
| 3ffe:200:10:3::3 | Any | Egress | ← 602
| 3ffe:200:10:1::/64 | Any | Egress |
| 3ffe:200:10:2::/64 | Any | Ingress |
| 3ffe:200:10:3::/64 | Any | Ingress |
| default | 3ffe:200:10:1::/64 | Egress |
| default | 3ffe:200:10:2::/64 | Egress |
| default | 3ffe:200:10:3::/64 | Egress |

| HoA | CoA | N/W | LMN (out) |
|---|---|---|---|
| 3ffe:200:10:1::2 | 3ffe:400:10:1::2 | 3ffe:200:10:2::/64 | 3ffe:200:10:3::3 |
| | | 3ffe:200:10:3::/64 | |
| 3ffe:200:10:3::3 | 3ffe:300:10:3::3 | | |

FIG 6C 407     604

| HoA | CoA | N/W | LMN (out) |
|---|---|---|---|
| 3ffe:200:10:1::2 | 3ffe:<u>400</u>:10:1::2 | 3ffe:200:10:2::/64 | 3ffe:200:10:3::3 |
| | | 3ffe:200:10:3::/64 | |

METHOD FOR MANAGING A MOBILE NETWORK

The invention relates to a method for operating a mobile network, to a mobile network itself and to components of, or for operating, such a mobile network.

Figure 1:
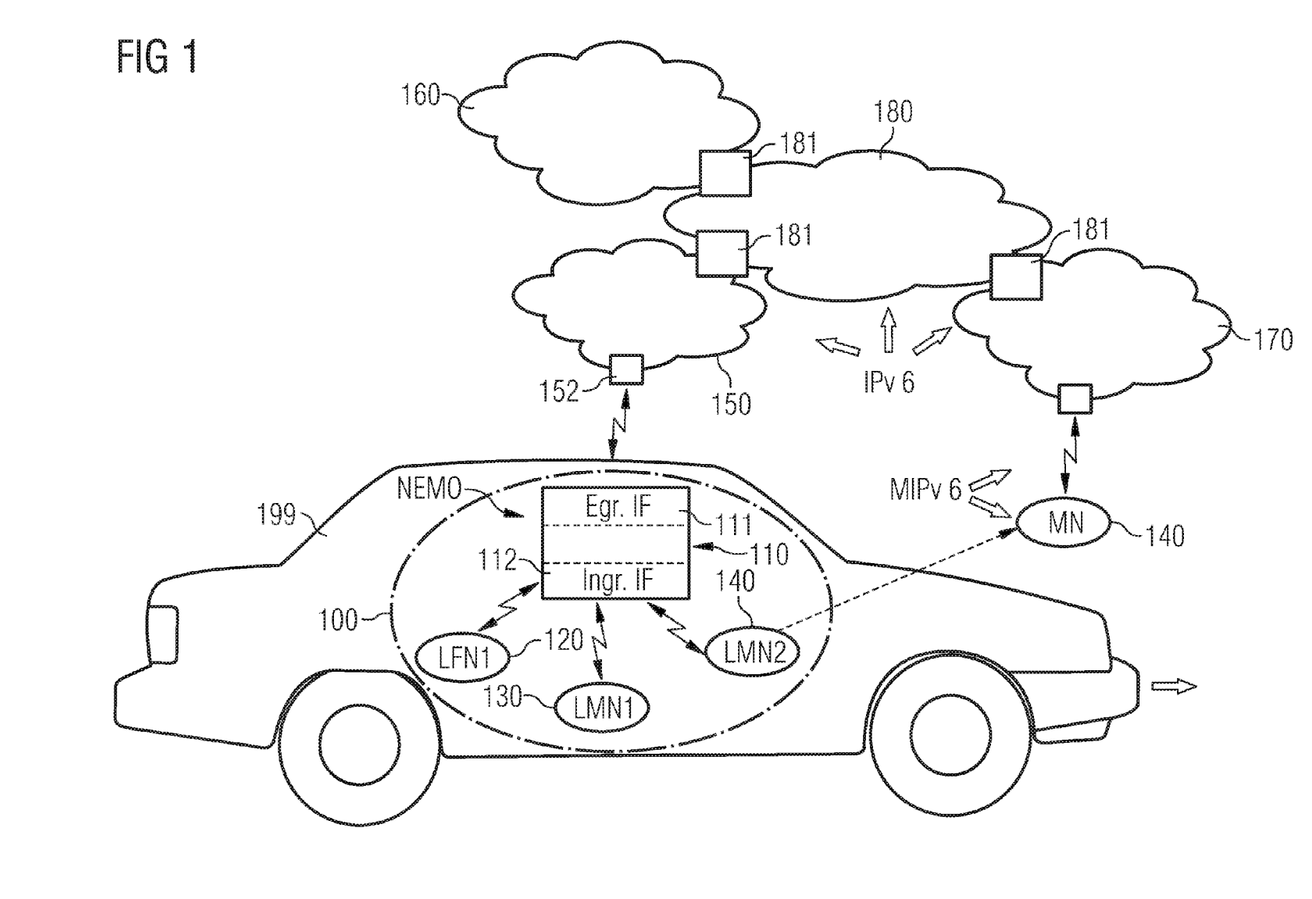
FIG. 1 is a basic overview.

With reference to FIG. 1, basic structures and terms are explained in the following. In FIG. 1, 180 denotes a data network for packet routing. It may be the core network of the internet. Numerals 150, 160 and 170 denote access networks or subnets linking to the core network 180 through access routers 181. All these components may be stationary. The considered components may be IPv6 compliant.

100 denotes a mobile network (MN). It may, for example, be a network of various digital devices in a moving entity 199 such as a car, a train or an airplane. The MN comprises network components such as a mobile router (MR) 110, zero, one or more local fixed nodes (LFNs) 120 and one or more local mobile nodes (LMNs) 130 and 140. The LFN(s) may be stationary in the MN. For example, they may be a fixed communication terminal in a car. The LMN(s)local mobile nodes 130 and 140 may leave the MN 100, e.g. by exiting the car in which the MR is mounted. The LMN(s) may have wireless links to the MR 110. The LFN(s) are, per definition, not capable of leaving the MN 100. The MR 110 has an egress interface 111 directed towards an access network in the stationary part of the internet, and has an ingress interface 112 directed towards the nodes in the MN.

Descriptions of various operations are as follows: IPv6 is described in RFC 2460 and others. Mobile internet protocol (MIPv6) is described in RFC 3775 and others. The operation of a MR is described in RFC 3693 and others, called "Network Mobility (NEMO) Basic Support Protocol". The LMNs (LMN1, LMN2) comply with mobile internet protocol (MIPv6). They can individually attach to an access point of an access network, such as 150, 160, 170, based on their own initiative according to MIPv6. Basic operations of MNs are described in the mentioned "NEMO" RFC 3963. The Internet-Draft "Network Mobility Support Terminology . . . " describes terminology as used for describing MNs.

Figure 2:
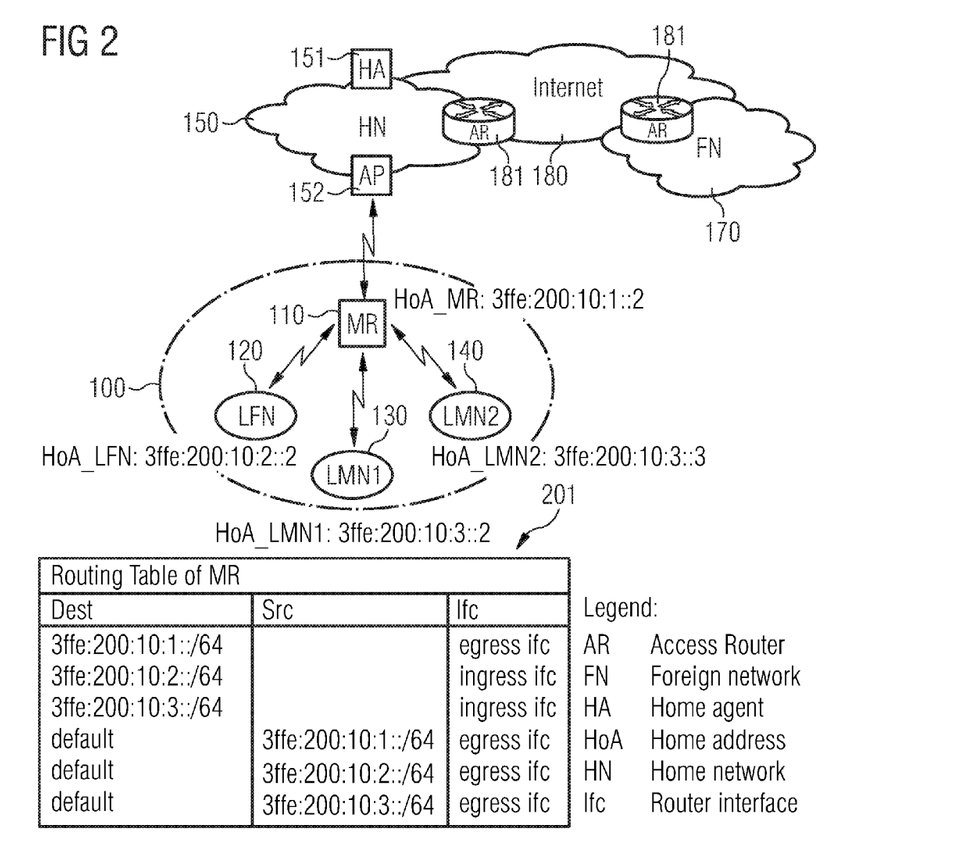
FIG. 2 is a representation of a MN.

FIG. 2 shows in more detail network arrangements for accommodating the needs of a MN. It is assumed that the MR attaches to its home network (HN) 150. A home agent (HA) 151 is provided there. 152 is the access point rendering, e.g., layer 2 connectivity. The communication between MR 110 and access point 152 may be wireless. FIG. 2, just as FIGS. 4 and 7, shows the home addresses (HoA) of the MR 110, of the LFN and of the two shown LMNs. It is to be noted that these components are assigned to different subnets in the available address space. The HoA of the MR is 3ffe:200:10:1::2, the HoA of LFN is 3ffe:200:10:2::2, and the HoAs of LMN1 and LMN2 are 3ffe:200:10:3::2 and 3ffe:200:10:3::3.

Figure 3:
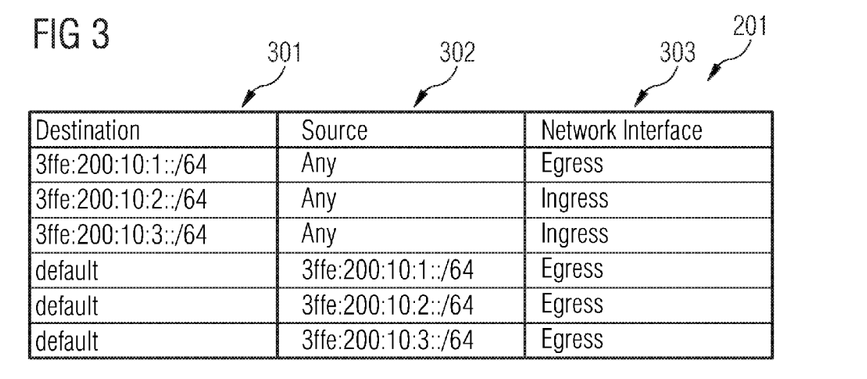
FIG. 3 is a representation of a MR's routing table, FIGS. 4A/B are representations of problems under present NEMO, FIGS. 5A/B depict basic procedures according to the invention.

201 denotes a routing table held in the MR 110, also shown in FIG. 3. The table has a destination column 301, a source column 302 and an interface column 303. This table usually holds network routings (which may be symbolized by ". . . ::/64" table entries), not host routings (which may be symbolized by ". . . ::n" table entries, n being a number). Packets destined for the LFN subnet (. . . :10:2::/64) go to the ingress interface and will, from there, be appropriately directed to the concerned LFN within the MN. Packets destined for the LMN subnet (. . . 10:3::/64) also go to the ingress interface and will, from there, be routed to the concerned LMN. Packets destined for the MR itself go to the egress interface. Packets not destined for any of the components within the MN will go to the egress interface irrespective of their source and will, from there, be routed to the stationary internet.

FIG. 3 shows the routing table. It has the destination column 301, the source column 302 and the network interface column 303. The routings to internal destinations (i.e. destinations within the MN) are network routings relating to all addresses of the concerned subnet irrespective of the particular host address.

Figure 4A:
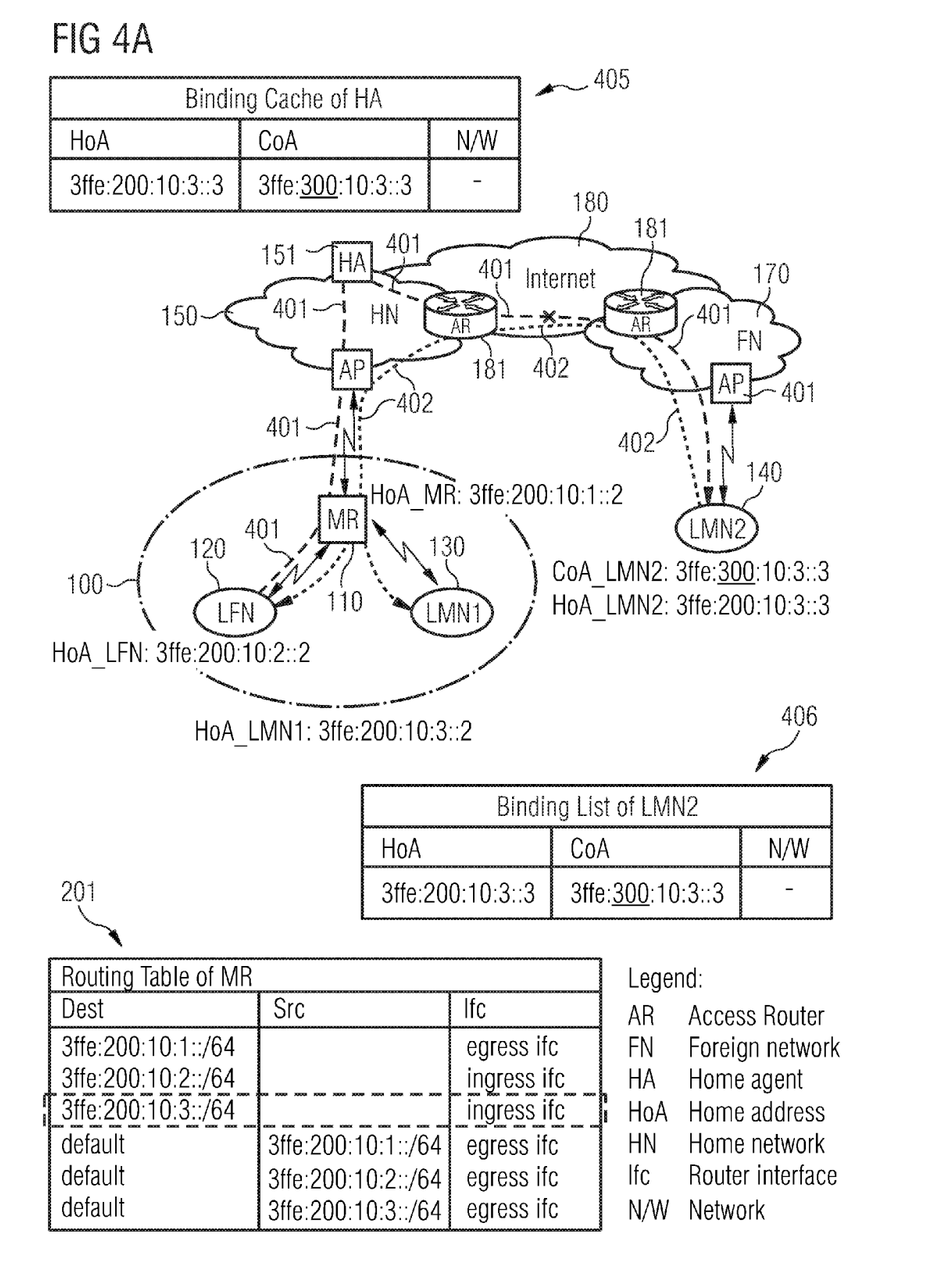

FIG. 4A shows the problem that occurs when an LMN (in the example of FIG. 4A LMN2) leaves the MN, for example by exiting the car, train or airplane having the MN and particularly the MR. Leaving the MN may actually, for example, happen by leaving the physical reach of the wireless access to the MR. The leaving device LMN2 may, then, however find another stationary access point and may attach through access point 401 to the foreign network FN1 170 by performing conventional MIPv6. It is to be noted that, at this instance, LMN2 and MR have the same HN 150 and may have—as shown—the same HA 151 in said common HN. They may also have different HAs within the common HN, these HAs then being required to communicate with each other for maintaining consistency. Under present NEMO procedure, there arises now a difficulty for the remaining nodes in the MN (LFN, LMN1) for reaching LMN2 both during ongoing sessions or for new sessions.

Present NEMO does not consider the case that an LMN leaves the MN. What happens when a node leaves a MN under present NEMO is the following: LMN2 has left the MN 100 and is attached to the internet elsewhere. The nodes 120 and 130 remain within the MN 100, however, still continue to address LMN2 under its HoA. If, for example, the remaining LMN1 130 wants to send a packet to the former member node LMN2 140, it will use its HoA 3ffe:200:10:3::3. Such a packet will go to the MR and will, there, be processed according to the routing table shown in FIG. 3. The routing table has a network route for the 3ffe:200:10:3::/64 subnet. All packets going to this subnet will be directed to the ingress interface of the MR 110, because the MR assumes that nodes belonging to this subnet belong to the MN for which it makes routing. So, the packet for LMN2 will not go to the egress interface and then to the stationary part of the internet, but to the ingress interface for further processing there within the MN. Accordingly, it is not possible to reach LMN2 outside the MN from within the MN. Present NEMO procedures have no approach for closing this gap.

In FIG. 4A, 401 denotes a desired path from inside the MN 100 (e.g. from LFN 120) to the former member node LMN2 140, what is, however, not possible because due to the described routing mechanism, a packet sent from inside the MN (e.g. from LMN1 or LFN) to LMN2 will not reach the egress interface of MR 110.

402 denotes a path from former member node LMN2 140 to inside the MN 100. This path is possible, because LMN2 will use the addresses of LMN1 and LFN, which are routed thereto in the usual manner.

In FIG. 4A, 405 denotes a binding cache table held in the HA 151. It has an entry relating to the former member node LMN2 140. However, it does not have an entry relating to the MR 110, because, if attached to the HN, the MR is an internal router just as every other router within the HN 150.

Figure 4B:
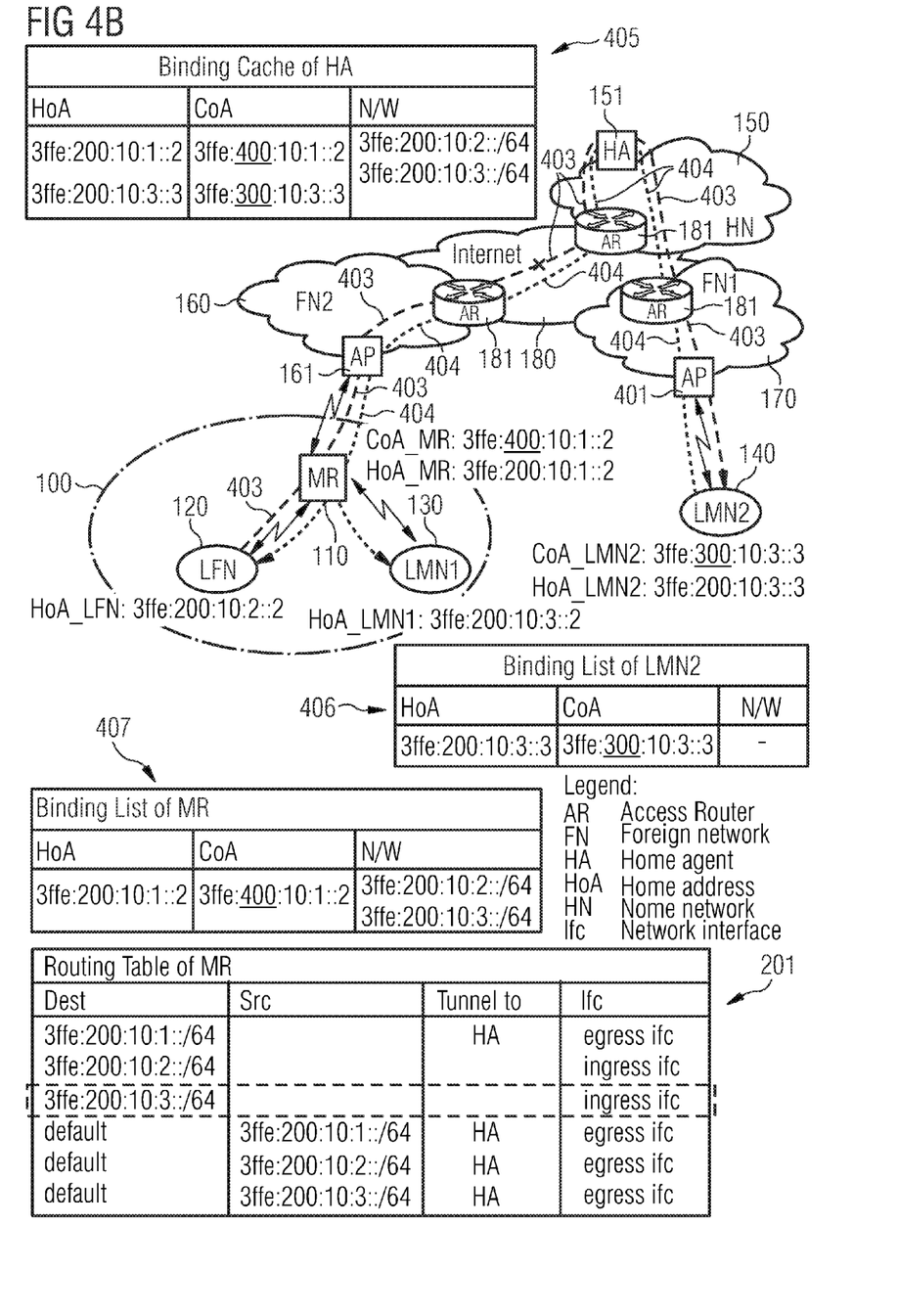

FIG. 4B shows a similar problem when the MR is attached to a foreign network rather than to its HN, i.e. the HA 151 being in another subnet than the access point 161. 160 denotes a foreign network FN2 rendering the access point 161 for the MN 100. According to MIPv6, then, additionally the MR holds a binding list and the HA holds a binding cache for accommodating the needs originating from the fact that attachment is made to a foreign network FN2 160 rather than to the HN 150 within which the HA 151 resides.

In FIG. 4B, 403 denotes the desired path from inside the MN, e.g. from LFN 120, to LMN2 140. Again, due to the described routing mechanism, a packet for former member node LMN2 140 will not reach the egress interface of MR 110, so that path 403 is not possible. Vice versa, path 404 is from former member node LMN2 140 to a node within the MN 100. This path is possible because the nodes within MN are addressed in the usual way, and routing is made in the usual manner.

In FIG. 4B, 405 denotes the binding cache of the HA 151. It has entries relating to the MR (HoA MR: 3ffe:200:10:1::2) and relating to the former member node (HoA LMN2:3ffe: 200:10:3::3). Likewise, the MR maintains a binding list 407 defining for the MR the HoA, the care-of-address (CoA) and the subnets under consideration (3ffe:200:10:2::/64, 3ffe: 200:10:3::/64). 408 is the binding list of the former member node LMN2 140.

It is the object of the invention to provide a method for operating a MN, a MN itself and components of such a MN which are capable of maintaining reachability of a mobile node that has left the MN from within the MN.

This object is accomplished by the features of the independent claims. Dependent claims are directed on preferred embodiments of the invention.

According to a method for managing a MN having local mobile nodes and a MR for routing packets amongst said local mobile nodes and to and from another packet routing network, first an indication condition is recognized which indicates that a mobile node which has been member of a MN has left the MN. Then, one or more network components of the MN are notified accordingly, particularly by identifying the former member node. In response to such a notification, one or more settings within one or more network components are adapted. Particularly, the notification may be sent to the MR. This MR may adapt its routing table in an appropriate manner. A host route to the former member node may be added.

The recognition of the indication condition may be made in the HA outside the MN which might realize, first, that the former member node updates its binding when coming from a MN, thus indicating that LMN has left the MN. Accordingly, the HA may send said notification, particularly towards the MR.

A MR may have receiving means for receiving a notification about a former member node that has left, and has modifying means for modifying its routing table in accordance with said notification.

A HA has means for recognizing an indication condition for recognizing that a mobile node coming from a MN has left said MN. It also has means for composing and sending out a related notification, particularly to the MR of the MN to which the mobile node was belonged before.

A MN may implement the described managing method. A MN may have network components (MR 110, HA 151, nodes) as described above and below.

A data carrier may carry an executable code adapted for implementing one or more method steps of the invention as described in the specification and/or in the claims, and/or adapted for making a MR or a HA operative as described above.

In the following, embodiments of the invention will be described with reference to the drawings, in which.

Same reference numerals in the Figures shall denote same components. Features of the invention shall be deemed combinable, even if this is not explicitly said, as far as a combination of features is not technically excluded. A disclosure relating to a component or an apparatus shall also disclose, as far as possible, a method step implemented by said component, and shall also be considered as a disclosure for computer code required for rendering the described component/apparatus operative or for implementing the method. Likewise, method claims shall disclose corresponding apparatus and computer program features.

Figure 5A:
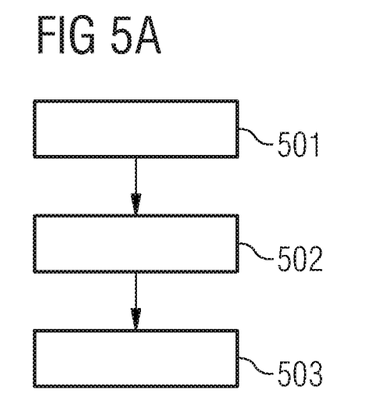

FIG. 5A is a very basic flow diagram of features of the invention. In step 501, an indication condition is recognized, said indication condition showing that a former member node LMN2 140 of a MN 100 has left said MN.

As far as necessary, in step 502 one or more notifications are sent for notifying concerned network components about the fact that a member node has left the MN. This may also include primary and secondary notifications (the secondary being triggered by the primary one).

In step 503, modifications of network settings are made for enabling the routing of packets from inside the MN to the former member node LMN2 140 that is now outside the MN. This may particularly include modifying a routing table, particularly in the MR.

Figure 5B:
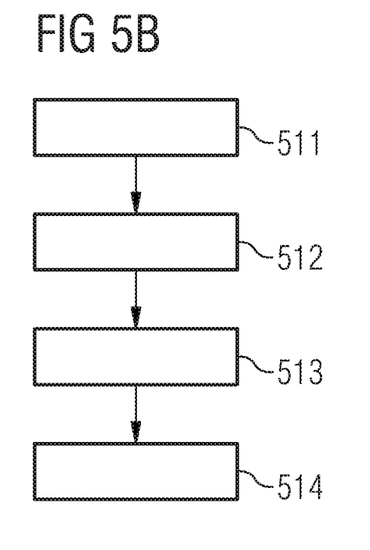

FIG. 5B shows a more detailed flow according to the invention. Step 511 is the recognition of the indication condition about the fact that a local mobile node LMN2 has left a MN. This may happen in the HA based on and/or in response to a binding update (BU) under MIPv6 initiated by the leaving node LMN2. Recognition may further be made with reference to binding cache entries, particularly with reference to address ranges of HoA. It is pointed out in this respect that certain address ranges/sub-nets may be reserved for MRs, so that from an examination of an address range or sub-nets relating to the MR in the binding entries it can be determined whether the updating mobile node came from a MN.

Recognition of the indication may possibly also be done following one or more of the following options: A change in connectivity, particular layer 2 connectivity, of a LMN is recognized, particularly that the LMN has lost connectivity, or quality/signal strength of a link to LMN changes/decreases. Likewise, a command may be issued by a network component, particularly by a component of the MN, particularly by the LMN2 140 or by the MR 110. The recognizing component may send out a related notification, particularly under MIPv6 provisions and as described in this specification in case HA detects a leaving LMN.

In step 512, a notification is sent to concerned network components. Particularly, the notification may be sent from the HA to the MR. It may be sent under MIPv6, and particularly with a particular header extension and header extension type thereof. The header extension may be a mobility header as described in RFC 3775, section 6.1. Either a complete new header extension type may be used (not known from either of RFC 4068 or RFC 3775), or the header extension may be a mobility header type known from one of these RFCs, with particular settings. The notification may identify the updating node to the MR.

In response to the notification, the MR may alter its routing table such that packets coming from within the MN can reach the egress interface of the MR. Depending on the earlier settings, this may be one or more of the following:

If the MR holds network routes to subnets, the modification may be the placing of a host route to the routing table, the host route identifying the egress interface of the router as the network interface to be used for such packets. According to routing procedure, host routes are preferred to network routes. Accordingly, if the routing table holds a host route for a destination in a subnet for which it also holds a network route, the host route will prevail over the network route. If the host route points to the egress interface, related packets will go to the egress interface.

If the routing table of the MR holds host routes, such a host route for the former member node may be modified to point to the egress interface.

Step 514 is a notification from the MR 110 to the HA 151. It may be sent in response to the notification received from the HA 151 and/or in response to the completion of the routing table modification of step 513. Again, this message may be sent under a mobility header. It may use a new mobility header type.

Figure 6A:
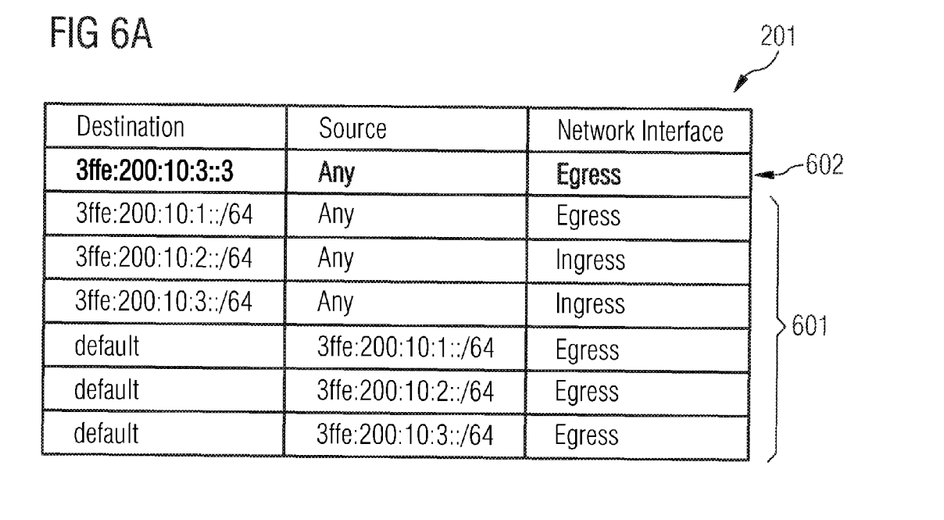
FIGS. 6A-C show a routing table of a MR, a binding cache of a HA, and a binding list of a MR, FIGS. 7A/B show effects and features of the invention, FIGS. 8A/B show messaging and signaling according to the invention.

FIG. 6A shows a routing table 201 of MR 110 according to the invention after modification. It has the former usual entries 601 and an added entry 602 constituting a host route for the LMN2 packets towards the egress interface.

Besides the features described so far, both the HA 151 and/or the MR 110 may have, in their binding cache table 405 or in their binding list table 407, a new field identifying a related node as a node having left a MN (field "LMN (out)").

Figure 6B:
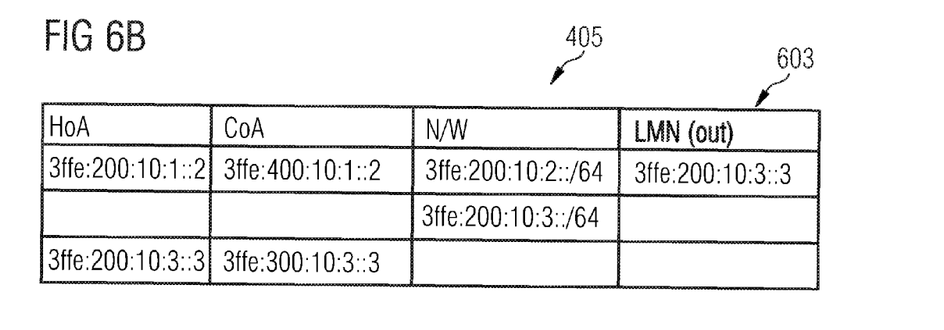
Figure 6C:
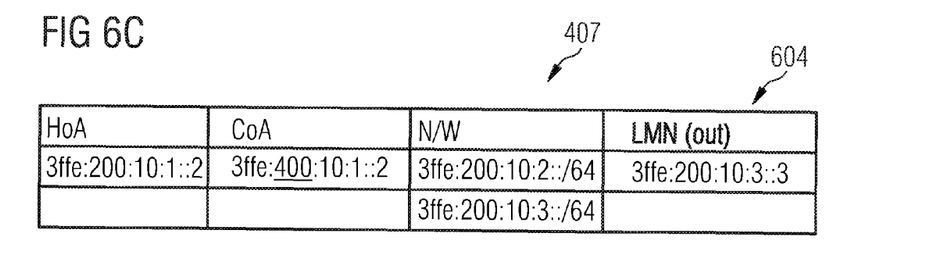

FIG. 6B*b* shows a binding cache 405 of the HA 151 according to the invention (in case of MR attaching to a foreign network), and FIG. 6C shows a binding list 407 of the MR 110 according to the invention (in case of MR attaching to a foreign network). Both have fields "LMN(out)" 603 and 604 in addition to their usual fields and columns. When a leaving node has been recognized, it can be identified in said new fields 603, 604. It is to be noted that one of said fields may have plural entries because plural LMNs may be out According to the invention, a packet delivery mechanism for fixing the problem of non-reachability of a node after it has left the MN is proposed. The new features can be summarized as follows:

1. Extended HA Functionality when Supporting NEMO-Based MNs
   1.1. Recognizing an indication condition,
   1.2. composing and sending out of a new notification, particularly under a mobility header MH Type 8,
   1.3. processing of a new notification acknowledgement, particularly under a mobility header message MH Type 9
   1.4. processing of BU/BA with mobility option 6
   1.5. processing of its new Binding Cache's field "LMN (out)"
2. Extended Binding Cache at HA
   2.1. new field "LMN(out)"
3. Extended MR Functionality
   3.1. receiving and processing of new Notification Message MH Type 8
   3.2. composing and sending out of new Notification Acknowledgement Message MH Type 9
   3.3. processing of BU/BA with mobility option 6
   3.4. processing its new Binding List's field "LMN(out)"
   3.5. extended processing of its Routing Table
4. Extended Binding List at MR
   4.1. new field "LMN(out)"
5. Extended MIPv6
   5.1. BU/BA with mobility option 6 including a "D" flag One or more of the above enumerated features may be used as appropriate.

The proposed scheme can be deployed by modifying the NEMO basic support protocol at local entities such as the MR and mobile nodes of the MN, leaving entities in the core or in other administrative domains untouched.

Figure 7A:
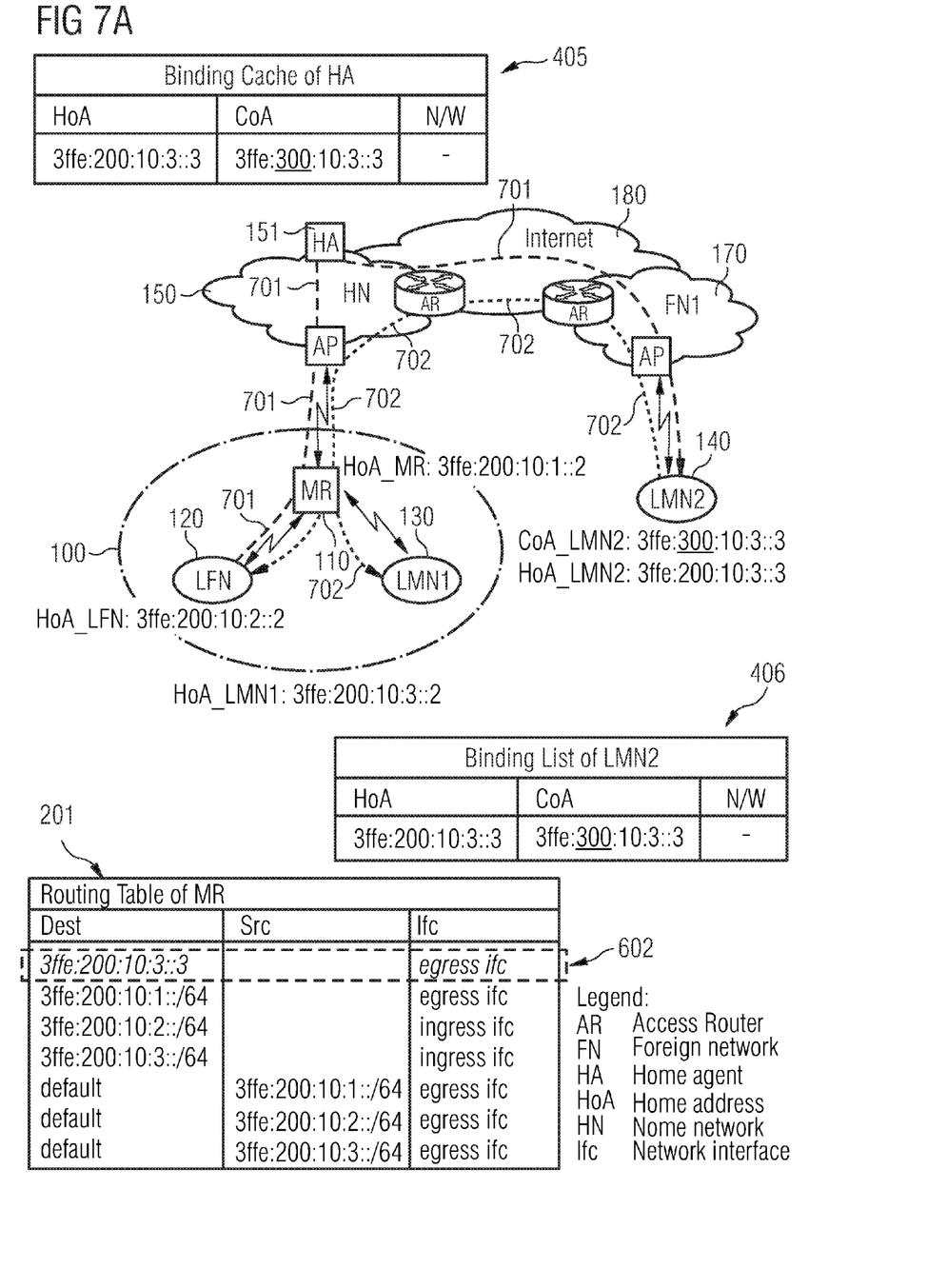
Figure 7B:
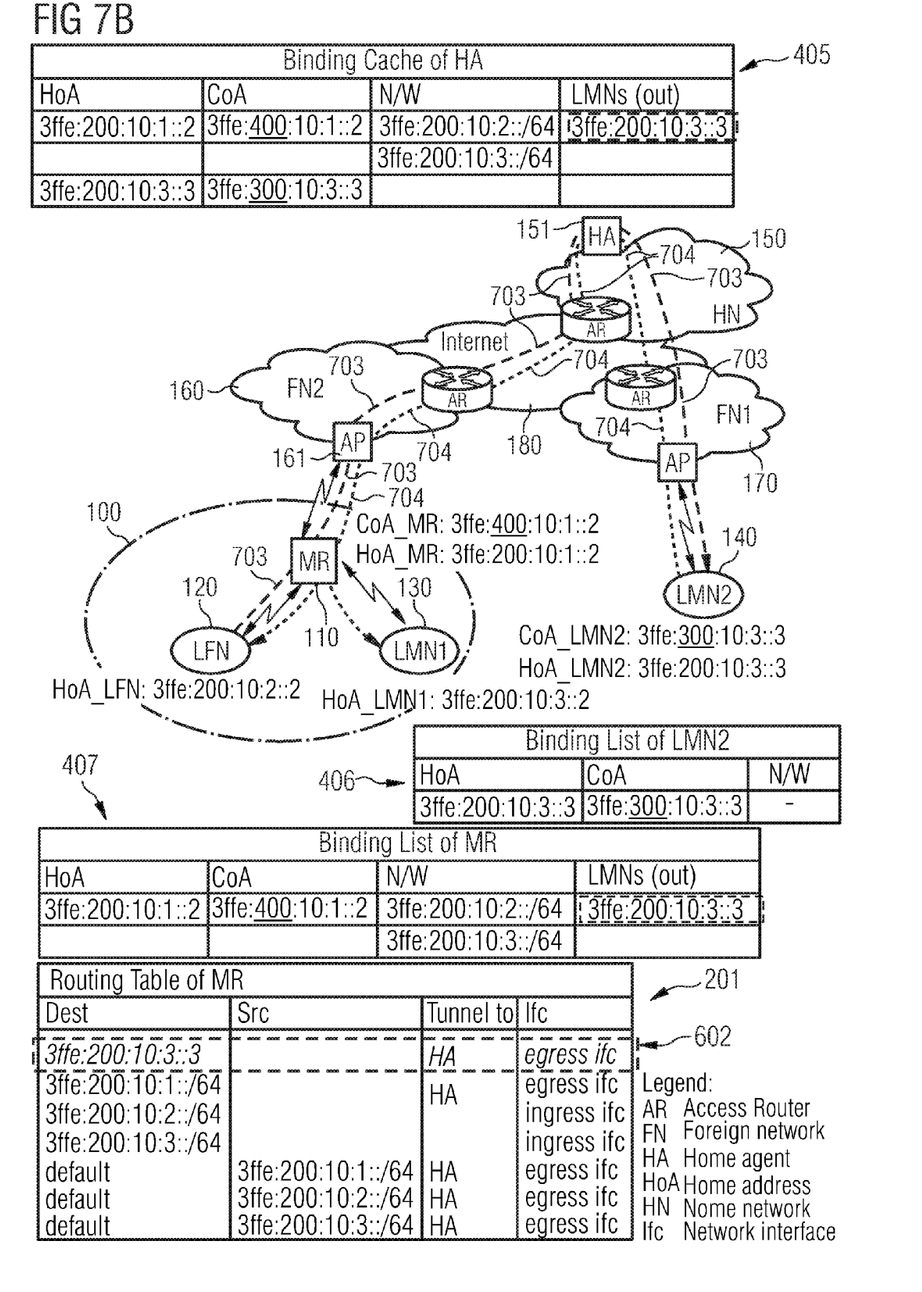
Figure 8A:
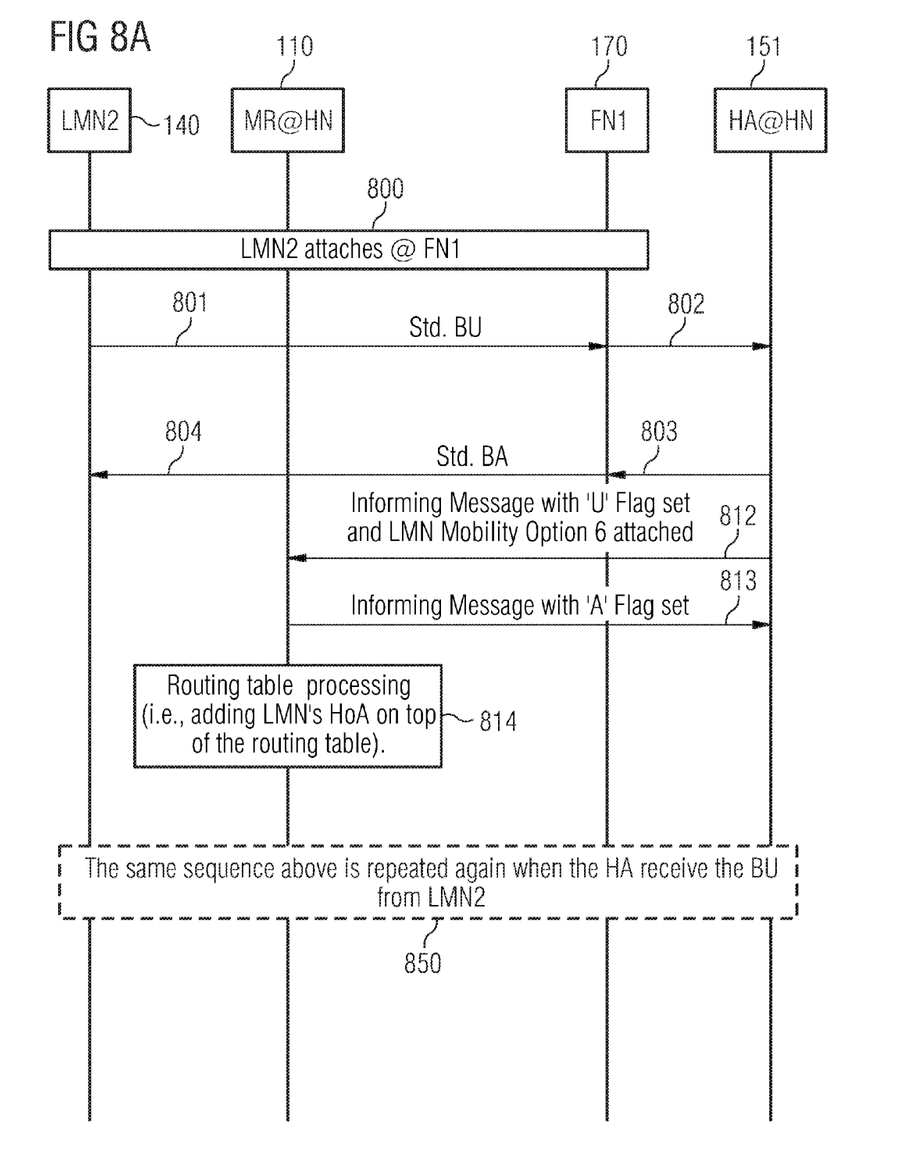
Figure 8B:
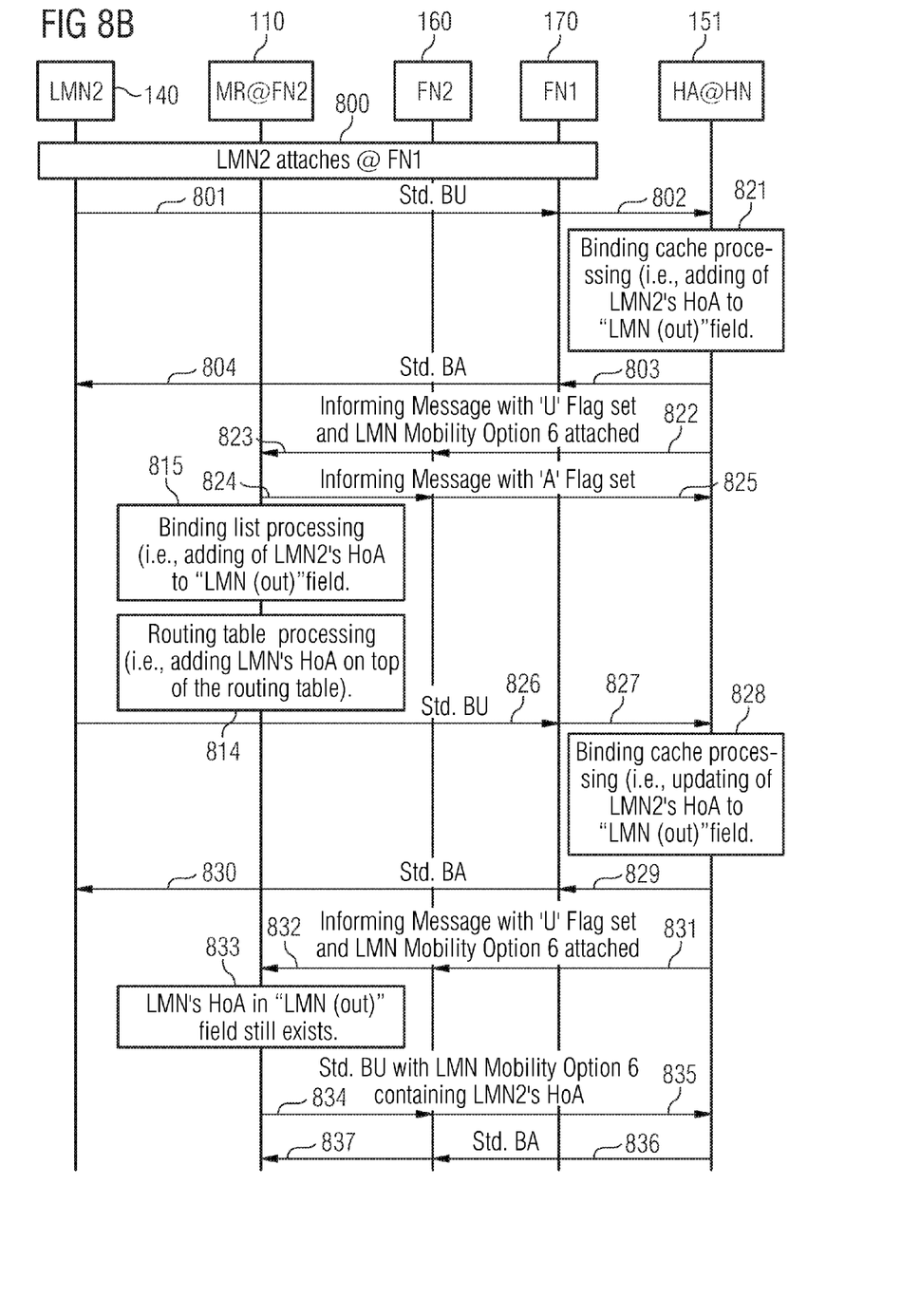

Looking at a particular sequence of actions, it may be as described in the following. Reference is made to FIGS. 6 to 8. It is pointed out in this respect that FIGS. 7A and 8A relate to the case that the MN is attached to the MR's HN, whereas FIGS. 7B and 8B relate to the case that the MN is attached to a foreign network with respect to the MR. FIGS. 7A and B are kinds of topological representations, including binding list showings and routing table showings for the different cases of whether the MR is attached to its HN or to a foreign network. FIGS. 8A and B are processing and messaging representations showing which messages are sent when and how. The sequence of actions (processings, messages) may be as indicated by the arrows, and may be from top to bottom.

1. The LMN (here: LMN2 140) leaves the MN 100 and attaches directly to a foreign network (here: FN1 170) by performing MIPv6 procedures itself, symbolized by 800. LMN2 sends standard BU 801, 802 to its HA 151. To register LMN2 at the HA 151, the HA will perform all conventional activities as specified in MIPv6.
2. The HA identifies or tries to identify, respectively, LMN2's MN in its binding cache 405. Each HA supporting NEMO-based MNs knows (by means of a configuration file) its supported MRs and its local nodes associated with the MRs in terms of address prefixes. Hence, the HA checks whether the HoA of LMN2 is in a predefined address range in its configuration file to identify the belonging LMN2's MN. Further processing depends of the outcome:
   2.1. If it does not exist (no binding cache entry, which is the case when the MN is attached to MRs HN as assumed in FIGS. 7A and 8A): HA has not identified a CoA of LMN2's MR. Hence, HA 151 then sends a Notification Message 812 with 'U' flag set (Mobility Header Type 8 (MH Type 8)) with new mobility option 6 called 'LMN Mobility Option' to the LMN2's MR HoA—processing 812.
   2.2. If it exists (binding cache entry existing because the MN is attached to a foreign network (FN) of MR as assumed in FIGS. 7B and 8B), HA identified the current CoA of the LMN2's MR. Hence, HA fills a new "LMN (out)" field in the binding cache 405 under the MRs binding entry (the cache indicating also LMNs by means of their HoA that left the MN)—processing 821. HA 151 then sends a new Notification Message with 'U' flag set (Mobility Header Type 8 (MH Type 8)) with new mobility option 6 called 'LMN Mobility Option' to the former LMN2's MR (addressed with MR's current CoA) via FN2 160—822 and 823.
3. When the MR receives the new Notification Message MH Type 8, further processing depends on its current location:
   3.1. If it is at home (FIGS. 7A, 8A), MR adds an additional routing entry directing LMN2's HoA to its egress interface - processing 814. Added is LMN2's HoA 3ffe:200: 10:3::3 to the routing table 201 together with a network prefix of 128-bit thereby overriding the 64-bit prefix that is currently set (3ffe:200:10:3::/64) and routes to ingress interface. According to standard routing the longer network prefixes are processed first. It replies then to the HA with new Notification Message with 'A' flag set—processing 813 which may be before or after processing 814. It is noted here that in the case of a later standard BU from LMN2, the sequence of 801 to 814 may be repeated, wherein 814 may be a refresh processing—box 850

3.2. If it is NOT at home (refer to FIGS. 7B, 8B), MR checks whether a new "LMN(out)" field is set in the binding entry of the binding list.

3.2.1. If it is not set, MR adds LMN2's HoA to the new "LMN(out)" field in the binding list—processing 815, and before or after that MR adds an additional routing entry directing the LMN address to its egress interface—processing 814, i.e. adding LMN2's HoA 3ffe:200:10:3::3 to the routing table (see also explanatory text above). MR 110, then (or before 814 or 815), replies to the HA with a new Notification Acknowledgement Message with Mobility Header Type 9 (MH Type 9) via FN2 160—messages 824, 825.

3.2.2. If it is set, MR sends a standard binding update (BU) with a particular option (e. g. the new mobility option 6) to the HA 151.

The procedure may end here. However, it may continue as follows:

4. If LMN2 returns to its former MN:

4.1. As soon as LMN2 detects that LMN2 has attached to the MR 110, it must deregister with the HA allowing that packets will go through the MR to reach LMN2.

4.2. In addition to the standard BA 829, 830 sent to LMN2, the HA MUST send new Notification Message with new mobility option 6 including a new "D" flag set.

5. If LMN2 BU has expired and been removed from the HA's binging cache, the HA must send new Notification Message with new mobility option 6 including a new "D" flag set, preferably to the MR.

6. The lower third of FIG. 8B (steps 826 and following) shows the sequence for the refreshing binding update as it may be practiced, e.g. for the new entries shown in FIGS. 6A, 6B and 6C, particularly entry 602 in FIG. 6A, and entries in columns 603, 604. LMN2 is attached to, and communicates through FN1 170, whereas MR 110 is attached to, and communicates through, FN2 160. Since the sequence is not the same as in the first binding update process (i.e. upper half of FIG. 8B), it is explicitly mentioned without putting it, as in FIG. 8A, in a broken lined box 850. First (826, 827), LMN2 sends a standard BU to HA as refreshing BU. HA then performs a binding cache processing (828), particularly by updating of LMN2's HoA to the "LMN (out)" field. HA replies with a BA to LMN2 (829, 830). HA also sends an informing message (with a particular flag, e.g. the U flag) to MR (831, 832). Now, instead of sending an informing message (with A flag), MR sends a BU message with the Mobility option 6 to HA (834, 835). In response, the HA sends a BA to MR (836, 837). Steps 834 to 837 are particular. They accomplish two purposes, namely acknowledging HA and sending MR's own refreshing BU, as identified by a particular mobility option and/or flag set. Thus, a message, and accordingly time and bandwidth, are saved. 833 may be provided prior to and as a prerequisite of 834 and following. It may be a check or status indication of whether an LMN's HoA still exists in the "LMN(out)" field, or it may be a refresh of the entry in the MRs binding list.

There may be more messages and processings than those shown in FIGS. 8A and 8B. Particularly, known standard processings, e.g. under MIPv6, may additionally be performed although they are not shown in FIGS. 8A and 8B.

As proposed with the above outlined detailed sequence action and as depicted in the Figures, in case a component still within the MN 100, such as LMN1 130 (or LFN 120) sends packets destined to LMN2 140, the entry of row 602 in FIG. 6 will route the packets to the egress interface of MR from where they are routed to LMN2 140, as indicated by broken lines 701, 703. 702 and 704 indicate the respective conventional ways back (from outside LMN2 140 to inside, e.g. LMN1 130). Since the HA is doing the proxy neighbor discovery on behalf of LMN2, it will capture the packets and send them to the LMN2's CoA.

As depicted in FIG. 7B in case that LMN1 (or LFN) sends packets to LMN2, the tunnel established by the 3ffe:200:10:3::3 host route to HA 151 via MRs egress interface is taken to route the packets to LMN2. The packets are tunneled from MR 110 to HA 151 through MRs egress interface. Since the HA is doing the proxy neighbor discovery on behalf of LMN2, it will capture the packets and send them to the LMN2's CoA.

In FIG. 8A, box 815 denotes the regular binding update (BU) and binding acknowledgement (BA) amongst the concerned units. BU/BA may be exchanged amongst LMN2 and HA, but also amongst HA and MR for maintaining the entry 602 as long as LMN2 is out.

Figure 9:
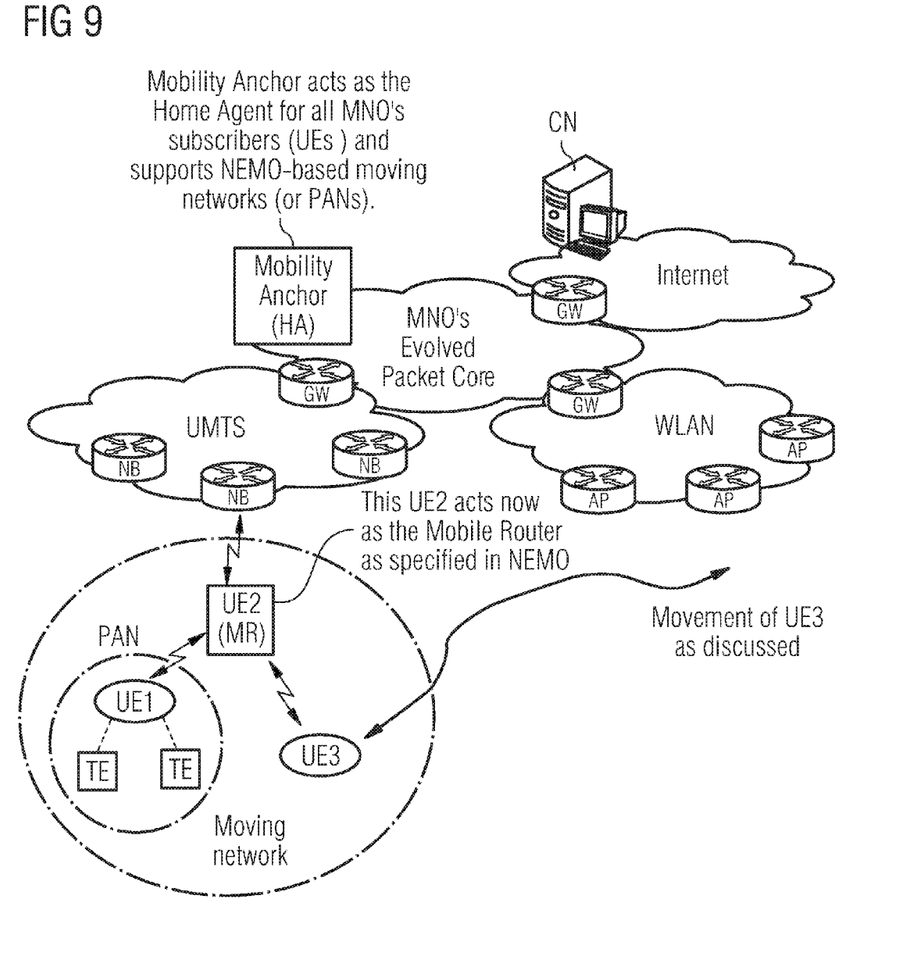
FIG. 9 shows a 3GPP environment.

When the MN or a Personal Area Network (PAN) are in a 3GPP environment, this scenario is quite similar to the above scenarios since the individual accesses of a 3GPP system can be seen as foreign networks from the perspective of IP (sub-) networks. FIG. 9 depicts the application of the proposed mechanism in a 3GPP environment.

Figure 10:
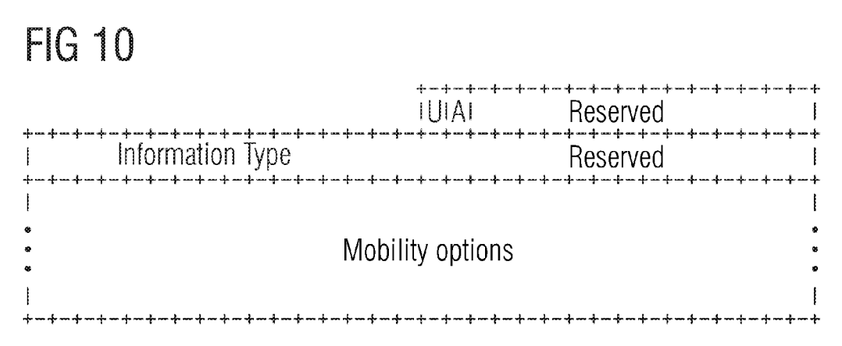
FIG. 10 shows a possible format of a message data field in a mobility header.

New messages and options may be as follows: As outlined above the proposed packet delivery mechanism includes a new Notification Message 812, 822, 823 with 'U' flag set (Mobility Header Type 8 (MH Type 8)) with new mobility option 6 called 'LMN Mobility Option', which may be specified as follows:

New Notification Message (MH Type 8):

A MR and HA use this message to send an information to the other end. If the initiator of this message is a MR 110, the receiver MUST be its HA and vice versa. The Notification Message uses the MH Type value 8. When this value is indicated in the MH Type field, the format of the Message Data field in the Mobility Header may be as shown in FIG. 10.

Updating Information (U): The Updating Information (U) bit is set when a Node, which is either HA 151 or MR 110, want to send some information to the other end.

Acknowledgement Updated Information (A): The Acknowledgement Updated Information (A) bit is set to when a Node, which is either HA 151 or MR 110, send the acknowledgement to the Updating Information message.

Information Type: The number to identify the type of the information contained in the following mobility option.

Not excluded with this specification should be additional information like 'sequence numbers' etc that may be included in the reserved data fields of FIG. 10.

Figure 11:
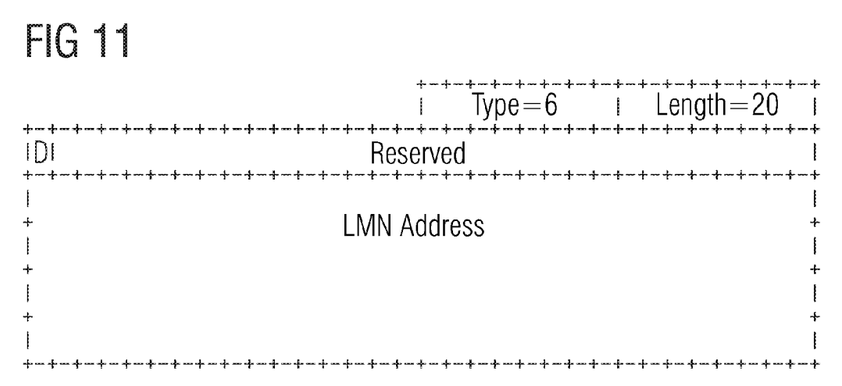
FIG. 11 shows a possible format of a mobility option entry.

LMN Mobility Option 6:

The LMN mobility option has an alignment requirement of 8n+2[4]. Its format may be as shown in FIG. 11.

Option Type: 6

Option Length: 8-bit unsigned integer. Length of the option, in octets, excluding the Option Type and Option Length fields. This field MUST be set to 20.

De-registration (D): The De-registration (D) bit is set when the LMN comes back to its MN, attaches to the MR and de-register to the HA 151. Basically this "D" flag is used within this invention for another purpose, as it is described here, although the term "D flag" is already known in other MIPv6 messages, but as said with another purpose and in another context.

LMN Address: The HoA of the local mobile node, which is away from its MN. This address MUST be a unicast routable address.

List of Abbreviations
AP Access Point
BA Binding Acknowledgement
BU Binding Update
CN Correspondent Node
CoA Care-of-address
DHCP Dynamic Host Configuration Protocol
FN Foreign Network
FR Foreign Router
FTP File Transfer Protocol
GW Gateway
HA Home Agent
HN Home Network
HoA Home Address
HR Home Router
ID Identifier
Ifc Interface
LFN Local Fixed Node
LMN Local Mobile Node
MIPv6 Mobile Internet Protocol version 6
MH Mobility Header
MN Mobile Network
MNO Mobile Network Operator
MR Mobile Router
N/W Network
NB NodeB
NE Network Entity
NEMO Network Mobility
PAN Personal Area Network
PDN Packet Data Network
UE User Equipment
VMN Visiting Mobile Node
WG Working Group

The invention claimed is:

1. A method for managing a mobile network having local mobile nodes and a mobile router for routing packets amongst said local mobile nodes and to and from another packet routing network, comprising the steps of
    in response to a recognized indication condition indicating that a local mobile node left the mobile network, notifying one or more components in the mobile network accordingly, and
    in one or more of the components of the mobile network, adapting one or more settings in accordance with said notification;
    comprising, in the mobile router, the steps of
    receiving under a first mobility header a message from the home agent rendering the notification that a particular mobile node has left,
    adding to the routing table a host route to the local mobile node that has left or modifying a host route to the local mobile node that has left, and
    sending under a second mobility header a confirming message to the home agent.

2. The method of claim 1, wherein the indication condition comprises one or more of the following:
    a recognized change in layer 3 connectivity of a mobile node, particularly a recognition of a home agent that a mobile node that is updating its binding at said home agent came from a mobile network,
    a recognized change in layer 2 connectivity of a mobile node, particularly that the mobile node has changed the layer 2 access, and
    a command issued by a network component, particularly by a component of the mobile network, particularly by the local mobile node or by the mobile router of the mobile network.

3. The method of claim 1 comprising, in the mobile router, the steps of maintaining in the binding list of the mobile router a leaving node field and, after having received under said first mobility header said message, setting in the leaving node field the address of the node that has left.

4. The method of claim 3 comprising, in the home agent, the steps of maintaining in the binding cache of the home agent a leaving node field and, after having recognized the detection state, setting in the leaving node field an indication on the address of the node that has left the mobile network.

5. The method of claim 3, wherein in the leaving node field the address or the indication thereof is reset when the mobile node re-enters the mobile network.

6. The method of claim 1, wherein the first mobility header is a mobility header type 8 header in accordance with RFC 3775 with a new flag and a particular mobility option set.

7. The method of claim 1, wherein the second mobility header is a mobility header not known from RFC 3775 or from the "Network Mobility Support Terminology" Internet draft.

8. A non-transitory computer readable medium carrying executable code adapted for implementing steps of the method according to claim 1.

9. A mobile router, comprising:
    a receiver configured to receive a notification from a home agent that a particular mobile node has left, and the notification prompting a modification of the mobile router's routing table; and
    a processor configured to modify the mobile routers routing table in accordance with said notification.

10. A mobile router according to claim 9, further comprising the mobile router's routing table holding a host route to a former member node.

11. A mobile router according to claim 9, comprising: a binding cache adapted to holding an address of a former member node.

12. A mobile network having a mobile router according to claim 9.

13. A home agent, comprising:
    a processor configured to recognize an indication condition by recognizing that a mobile node that updated its binding came from a mobile network; and
    a transmitter configured to compose and send out a related notification that the mobile node has left to the mobile router to which the mobile node was attached.

14. The home agent of claim 13, wherein the processor is further configured to compose a notification under mobility header type 8 with an additional flag and a particular mobility option set.

15. The home agent of claim 13, wherein the processor is further configured to:
    include a binding cache having a leaving node field; and
    set in the leaving node field an indication on the address of the node that has left the mobile network after the processor has recognized a detection state.

* * * * *